(12) United States Patent
Nishimura et al.

(10) Patent No.: US 11,217,867 B2
(45) Date of Patent: Jan. 4, 2022

(54) MANUFACTURING METHOD FOR SECONDARY BATTERY AND MANUFACTURING APPARATUS FOR SECONDARY BATTERY

(71) Applicants: J.E.T. CO., LTD., Okayama (JP); PRIMEARTH EV ENERGY CO., LTD., Kosai (JP)

(72) Inventors: Hiroyuki Nishimura, Okayama (JP); Shigeki Hashimoto, Okayama (JP); Hideaki Yoshio, Okayama (JP); Shigeki Saito, Kosai (JP); So Kudo, Kosai (JP); Yuji Yamasaki, Osaka (JP); Kunihiro Takaoka, Osaka (JP); Hidenori Tagomori, Osaka (JP)

(73) Assignees: J.E.T. CO., LTD., Satosho-cho (JP); PRIMEARTH EV ENERGY CO., LTD., Kosai (JP)

( * ) Notice: Subject to any disclaimer, the term of this patent is extended or adjusted under 35 U.S.C. 154(b) by 45 days.

(21) Appl. No.: 16/728,535

(22) Filed: Dec. 27, 2019

(65) Prior Publication Data

US 2020/0212419 A1    Jul. 2, 2020

(30) Foreign Application Priority Data

Dec. 28, 2018 (JP) .............................. JP2018-247211

(51) Int. Cl.
*H01M 50/00* (2021.01)
*H01M 50/636* (2021.01)
*H01M 50/60* (2021.01)

(52) U.S. Cl.
CPC ....... *H01M 50/636* (2021.01); *H01M 50/668* (2021.01)

(58) Field of Classification Search
CPC .... H01M 50/636; H01M 50/668; Y02E 60/10
See application file for complete search history.

(56) References Cited

U.S. PATENT DOCUMENTS

| 2004/0161666 A1 | 8/2004 | Haas et al. |
| 2010/0003583 A1 | 1/2010 | Seong et al. |

(Continued)

FOREIGN PATENT DOCUMENTS

| JP | H08-45488 | 2/1996 |
| JP | H11-25936 | 1/1999 |

(Continued)

OTHER PUBLICATIONS

Notice of Reasons of Refusal in parent Japanese Patent Application No. 2018-247211 dated Feb. 27, 2019.

(Continued)

*Primary Examiner* — Cynthia H Kelly
*Assistant Examiner* — Monique M Wills
(74) *Attorney, Agent, or Firm* — Wentsler LLC

(57) ABSTRACT

A manufacturing method for a secondary battery and a manufacturing apparatus for a secondary battery that are applicable to a secondary battery in which an electrolyte solution injection hole has a diameter of 1.5 mm or more are provided. The secondary battery includes a battery case including a cover plate provided with an electrolyte solution injection hole, and a sealing member sealing the electrolyte solution injection hole. The manufacturing method includes a preparing step and a press-fitting step. The preparing step is preparing a cell in which, after an electrolyte solution is injected to the battery case through the electrolyte solution injection hole, the sealing member is disposed on the electrolyte solution injection hole. The press-fitting step is press-fitting the sealing member into the electrolyte solution injection hole while applying press-fitting load and ultra- (Continued)

sonic vibration with a frequency of 20 kHz or more in parallel to a press-fitting direction.

8 Claims, 8 Drawing Sheets

(56) References Cited

U.S. PATENT DOCUMENTS

| | | | | |
|---|---|---|---|---|
| 2011/0300414 | A1* | 12/2011 | Baek | H01M 50/169 |
| | | | | 429/7 |
| 2013/0130079 | A1* | 5/2013 | Kako | H01M 10/04 |
| | | | | 429/82 |
| 2014/0065451 | A1 | 3/2014 | Fuhr et al. | |
| 2015/0194651 | A1* | 7/2015 | Urano | H01M 50/636 |
| | | | | 429/53 |
| 2016/0329535 | A1* | 11/2016 | Moomaw | B29C 65/18 |
| 2019/0140220 | A1* | 5/2019 | Jiang | H01M 50/172 |

FOREIGN PATENT DOCUMENTS

| | | |
|---|---|---|
| JP | 2007-021626 | 2/2007 |
| JP | 2010015991 | 1/2010 |
| JP | 2011-72990 | 4/2011 |

OTHER PUBLICATIONS

Extended European Search Report dated Mar. 23, 2020 in corresponding European Patent Application No. 19219401.7.

\* cited by examiner

FIG. 6
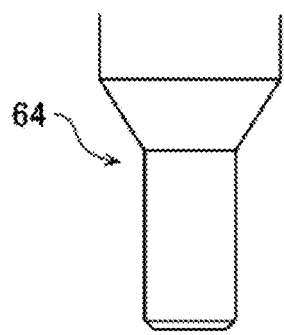
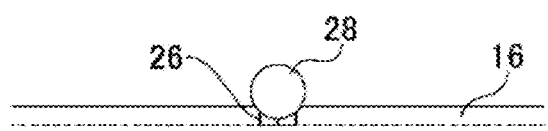
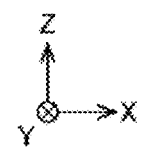

MANUFACTURING METHOD FOR SECONDARY BATTERY AND MANUFACTURING APPARATUS FOR SECONDARY BATTERY

CROSS REFERENCE TO RELATED APPLICATIONS

This application claims the benefit of foreign priority to Japanese Patent Application No. 2018-247211, filed on Dec. 28, 2018, which is incorporated by reference in its entirety.

BACKGROUND OF THE INVENTION

Field of the Invention

The present invention relates to a manufacturing method for a secondary battery in which an electrolyte solution injection hole provided to a cover plate forming an upper surface part of a battery case is sealed with a sealing member, and a manufacturing apparatus for the secondary battery.

Description of the Related Art

The cover plate forming the upper surface part of the battery case includes the electrolyte solution injection hole for injecting the electrolyte solution into the battery case. Through the electrolyte solution injection hole, the electrolyte solution is injected into the battery case, and after the injection, the electrolyte solution injection hole is sealed. In a sealing method, a rubber material integrated with an aluminum plate is inserted into the electrolyte solution injection hole and temporarily sealed, and then, the aluminum plate and the cover plate are seam-welded by a laser. However, the electrolyte solution adheres to the cover plate around the electrolyte solution injection hole; therefore, sputtering is easily caused in the laser welding and if a pin hole is formed in the welded part, the sealing becomes insufficient, which is a problem.

For this problem, for example, Patent Literature 1 (See Japanese Patent Laid-Open No. 2010-15991) has disclosed a method in which a tapered plane is formed in an upper part the electrolyte solution injection hole and a metal ball, which serves as the sealing member, is pressed with pressure into the electrolyte solution injection hole so that the electrolyte solution injection hole is sealed with the metal ball. In this method, while the metal ball is deformed, the metal ball is inserted into the tapered plane of the electrolyte solution injection hole and by the deformed metal ball, the electrolyte solution injection hole is sealed; thus, the welding step is unnecessary.

In the secondary battery, gas is generated due to charging and discharging, for example, and the internal pressure increases; thus, after the sealing, the pressure resistance against more than the internal pressure is necessary. That is to say, the holding power of the cover plate to hold the inserted sealing member needs to exceed at least the internal pressure (about 2 MPa).

In the method according to Patent Literature 1, it is necessary to insert the sealing member into the electrolyte solution injection hole with the press-fitting load small enough not to deform the cover plate (150 N or less). In the case of a small secondary battery in which the electrolyte solution injection hole has an inner diameter of about 1 mm, the holding power of more than the internal pressure can be obtained even with the load in the range where the cover plate is not deformed. If the inner diameter of the electrolyte solution injection hole is doubled, the holding power that is required is quadrupled in simple calculation, and even if the sealing member is inserted into the electrolyte solution injection hole with the load in the range where the cover plate is not deformed, the necessary holding power is not obtained. In order to obtain the larger holding power, it is necessary to increase the load in the insertion; however, making the load too high results in the deformation of the cover plate. Therefore, the method according to Patent Literature 1 has had a problem in that it is difficult to apply this method to a large secondary battery in which the electrolyte solution injection hole has an inner diameter of 1.5 mm or more, such as an on-vehicle secondary battery.

It is an object of the present invention to provide a manufacturing method for a secondary battery and a manufacturing apparatus for a secondary battery that are applicable to a secondary battery in which an electrolyte solution injection hole has an inner diameter of 1.5 mm or more.

SUMMARY OF THE INVENTION

A manufacturing method for a secondary battery according to the present invention is a manufacturing method for a secondary battery including a battery case including a cover plate provided with an electrolyte solution injection hole, and a sealing member sealing the electrolyte solution injection hole, the electrolyte solution injection hole having a tapered plane that expands in diameter toward an external surface of the battery case in the cover plate, the manufacturing method for the secondary battery including: a preparing step of preparing a cell in which, after an electrolyte solution is injected to the battery case through the electrolyte solution injection hole, the sealing member is disposed on the electrolyte solution injection hole; and a press-fitting step of press-fitting the sealing member into the electrolyte solution injection hole while applying press-fitting load and ultrasonic vibration with a frequency of 20 kHz or more in parallel to a press-fitting direction from a hone in contact with the sealing member.

A manufacturing apparatus for a secondary battery according to the present invention includes: a hone that is in contact with a sealing member disposed at an electrolyte solution injection hole provided to a cover plate of a battery case, and while applying press-fitting load and ultrasonic vibration with a frequency of 20 kHz or more in parallel to a press-fitting direction, press-fits the sealing member into the electrolyte solution injection hole; and a determination unit that determines whether a press-fitting state of the sealing member is defective or non-defective, based on an output value waveform expressing a time change of an output value of the hone and/or a sinking amount waveform expressing a time change of a sinking amount of the hone.

According to some embodiments of the present invention, the ultrasonic vibration is applied to the sealing member in the press-fitting direction. Therefore, the resistance in the press-fitting decreases and the sealing member can be press-fitted to the electrolyte solution injection hole smoothly with the press-fitting load small enough not to deform the cover plate. Since the ultrasonic vibration is applied, the surface of the electrolyte solution injection hole and the sealing member are in surface contact with each other and the very high holding power can be secured. Therefore, the manufacturing method for a secondary battery and the manufacturing apparatus for a secondary battery according to the present embodiment are applicable to a secondary battery in which the electrolyte solution injection hole has an inner diameter of 1.5 mm or more.

BRIEF DESCRIPTION OF THE DRAWINGS

FIG. 6 is a schematic view used in the description of the manufacturing method for a secondary battery according to the present embodiment.

DETAILED DESCRIPTION OF THE PREFERRED EMBODIMENTS

An embodiment of the present invention is hereinafter described in detail with reference to the drawings.

1. Overall Structure (Structure of Secondary Battery)

Figure 1:
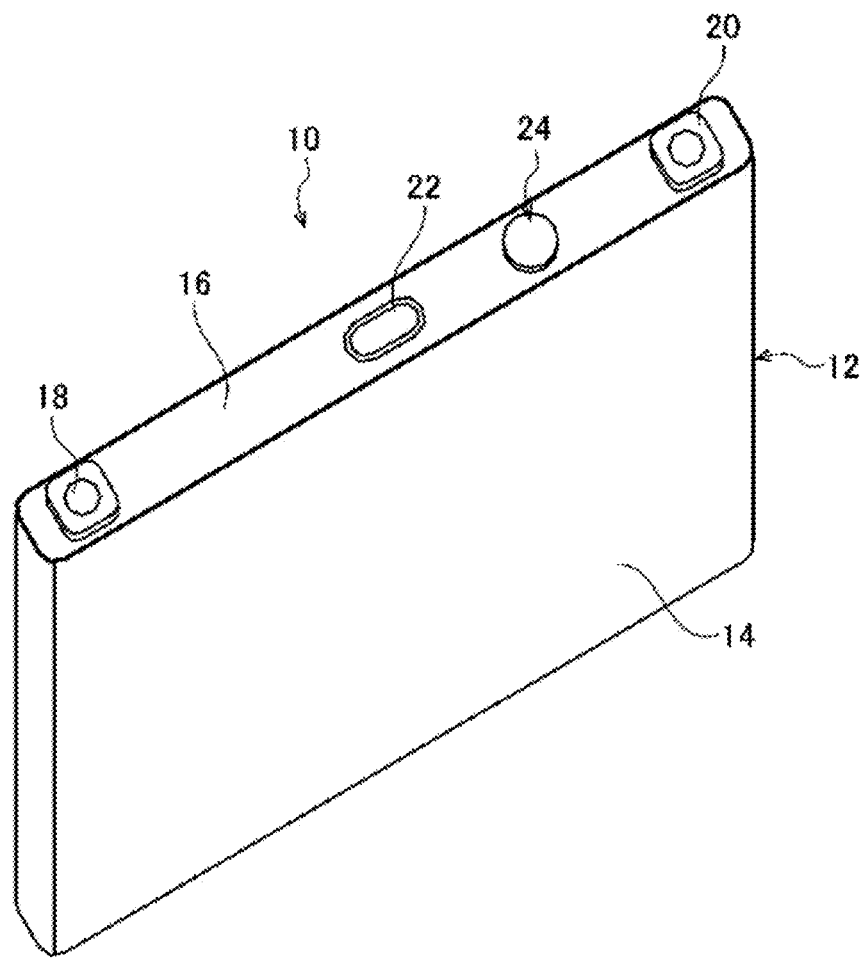
FIG. 1 is a perspective view illustrating a secondary battery to which a manufacturing method for a secondary battery and a manufacturing apparatus for a secondary battery according to the present embodiment are applied.

First, a structure of a secondary battery to which a manufacturing method for a secondary battery and a manufacturing apparatus for a secondary battery according to the present embodiment are applied is described. A secondary battery 10 illustrated in FIG. 1 corresponds to one example of a secondary battery to which the manufacturing method for a secondary battery and the manufacturing apparatus for a secondary battery are applied, and includes a battery case 12 with a rectangular parallelepiped shape, and an electrode assembly and an electrolyte solution, which are not illustrated, that are contained in the battery case 12. The battery case 12 includes a case main body 14 with an opening at one end and a cover plate 16 that covers the opening. As the material of the battery case 12, metal such as aluminum or aluminum alloy is used. The case main body 14 has a bottomed rectangular tubular shape. The cover plate 16 is a rectangular plate-shaped member, and includes a positive electrode terminal 18, a negative electrode terminal 20, a safety valve 22, and a sealing part 24.

The positive electrode terminal 18 penetrates the cover plate 16 in a thickness direction, and has one end protruding outside and the other end connected to a positive electrode plate of the electrode assembly in the battery case 12. Similarly, the negative electrode terminal 20 penetrates the cover plate 16 in the thickness direction, and has one end protruding outside and the other end connected to a negative electrode plate of the electrode assembly in the battery case 12. The safety valve 22 breaks open when the internal pressure of the battery case 12 has reached a predetermined value.

Figure 2:
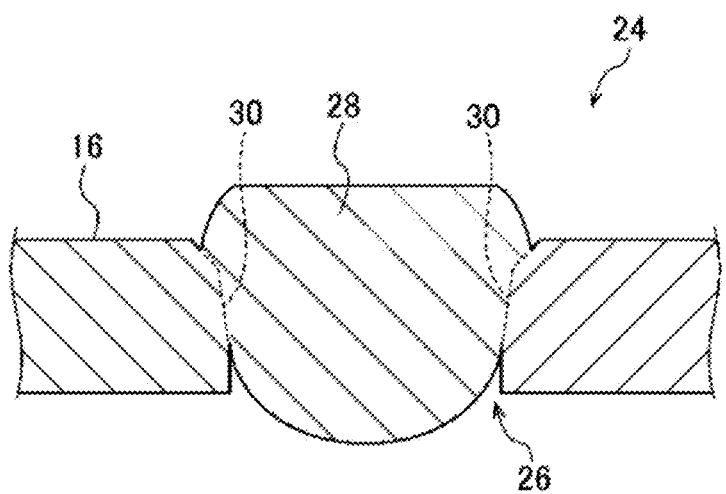
FIG. 2 is a cross-sectional view of a part of a sealing part of the secondary battery.

As illustrated in FIG. 2, the sealing part 24 is formed by press-fitting a sealing member 28 into an electrolyte solution injection hole 26. The sealing member 28 is flat in an upper part, is in surface contact with a surface of the electrolyte solution injection hole 26 in an area in a circumferential direction having the length in the thickness direction of the cover plate 16, and is spherical in a lower part. The sealing member 28 is in contact with the surface of the electrolyte solution injection hole 26 in a wide area ranging from a tapered plane to a straight plane of the electrolyte solution injection hole 26 to be described below. The upper part of the sealing member 28 protrudes from an upper surface side of the cover plate 16, and the lower part thereof protrudes from a lower surface side of the cover plate 16. Note that in the sealing part 24, the sealing member 28 does not need to protrude from the upper surface side of the cover plate 16. In addition, the sealing member 28 does not need to protrude from the lower surface side of the cover plate 16. A bonding plane 30 between the surface of the electrolyte solution injection hole 26 and the sealing member 28 is unified to such a degree that the border cannot be recognized. It is preferable that the electrolyte solution injection hole 26 and the sealing member 28 are unified and connected at an atomic level on the interface.

Figure 3:
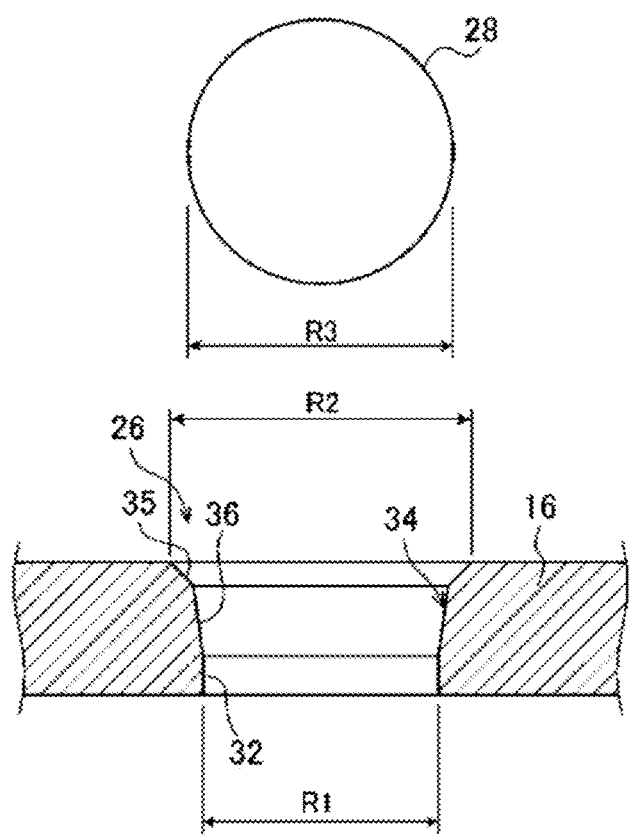
FIG. 3 is a cross-sectional view of a part of an electrolyte solution injection hole and a sealing member of the secondary battery before press-fitting.

The electrolyte solution injection hole 26 is a penetration hole with a minimum diameter of 1.5 mm or more and penetrates the cover plate 16 in the thickness direction. In the present specification, "the inner diameter of the electrolyte solution injection hole 26" means the minimum diameter of the electrolyte solution injection hole 26. The electrolyte solution injection hole 26 in FIG. 3 is a penetration hole in which the inner diameter R1 on an inner surface of the cover plate 16 is 1.5 mm or more, and includes a tapered plane 34 that expands in diameter toward an external surface of the cover plate 16. The tapered plane 34 includes an external tapered plane 35 that continues to the external surface of the cover plate 16 and an intermediate tapered plane 36 provided on an inner surface side of the external tapered plane 35. The electrolyte solution injection hole 26 includes a straight plane 32 on an inner surface side of the intermediate tapered plane 36. The intermediate tapered plane 36 is formed between the external tapered plane 35 and the straight plane 32. The straight plane 32 continues to the inner surface of the cover plate 16, includes an inner circumferential surface that is parallel to the axial direction, and has an inner diameter R1 of 1.5 mm or more. The angle (tapered angle) from the central axis of the straight plane 32 is larger on the external tapered plane 35 than on the intermediate tapered plane 36. The diameter R2 of a circumferential surface where the external tapered plane 35 and the external surface of the cover plate 16 are in contact is more than or equal to the diameter R3 of the sealing member 28, and it is preferable that the diameter R2 is 1.1 to 1.15 times the diameter R3 of the sealing member 28. The external tapered plane 35 may be omitted as appropriate and for example, just the intermediate tapered plane 36 and the straight plane 32 may be used or only the intermediate tapered plane 36 may be used.

The sealing member 28 is a ball formed of the material that is the same kind as or different from that of the cover plate 16, and the diameter R3 is selected as appropriate in the range larger than the inner diameter R1 of the straight plane 32. The material of the sealing member 28 is metal such as aluminum or aluminum alloy, and is preferably less hard than the metal of the material of the cover plate 16. The shape of the sealing member 28 is not limited to a sphere and may be a circular columnar shape, a tapered pin shape, or a rivet shape. The ball is preferable as the sealing member 28 because the cost is low, the handling in the press-fitting is easy, and press-fitting failure such as oblique press-fitting hardly occurs. The sealing member 28 is formed to have 0.1 to 1.0 mm larger diameter than the inner diameter R1 of the electrolyte solution injection hole 26, and for example, when the inner diameter R1 of the electrolyte solution injection hole 26 is 2 mm, the diameter R3 of the sealing member is preferably 2.1 to 3.0 mm. When the sealing member 28 has a spherical or circular columnar shape, the sealing member 28 is formed to have 0.1 to 1.0 mm larger diameter than the inner diameter R1 of the electrolyte solution injection hole 26. When the sealing member 28 has a tapered pin shape or a rivet shape, the sealing member 28 is formed so that the diameter of a side surface of the sealing member 28 that is in contact with the electrolyte solution injection hole 26 is 0.1 to 1.0 mm larger than the inner diameter R1 of the electrolyte solution injection hole 26.

For example, to the other end of the positive electrode terminal 18 and the negative electrode terminal 20 formed integrated with the cover plate 16, a positive electrode tab and a negative electrode tab of the electrode assembly are welded, respectively. Then, from the opening, the components are housed in the case main body 14 and the cover plate 16 is attached to the opening of the case main body 14. After the welding, the electrolyte solution is injected through the electrolyte solution injection hole 26 provided to the cover plate 16. The structure in which the electrolyte solution has been injected into the battery case 12 is referred to as a cell in the present specification. By sealing the electrolyte solution injection hole 26 at the cover plate 16 of the cell with the sealing member 28, the secondary battery 10 can be obtained.

(Structure of Manufacturing Apparatus)

Figure 4:
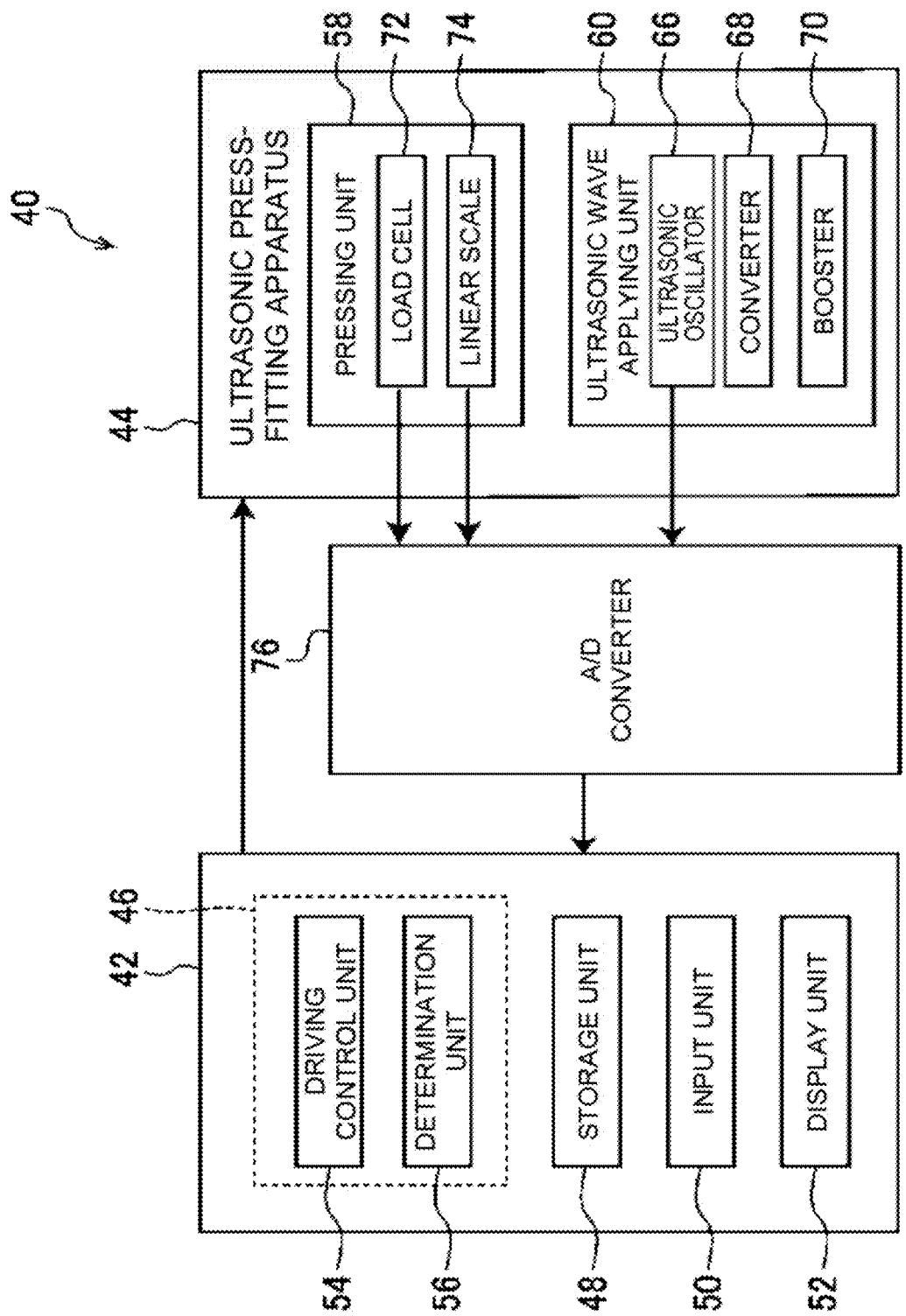
FIG. 4 is a block diagram illustrating a manufacturing apparatus for a secondary battery according to the present embodiment.

A manufacturing apparatus 40 includes a control device 42 and an ultrasonic press-fitting apparatus 44 as illustrated in FIG. 4. The control device 42 includes a calculation process unit 46, a storage unit 48, an input unit 50, and a display unit 52. The calculation process unit 46 includes a driving control unit 54. The calculation process unit 46 may include a determination unit 56. The ultrasonic press-fitting apparatus 44 includes a pressing unit 58 and an ultrasonic wave applying unit 60. The ultrasonic wave applying unit 60 includes an ultrasonic oscillator 66, a converter 68, and a booster 70.

The calculation process unit 46 includes a CPU (Central Processing Unit), and controls the entire manufacturing apparatus 40 collectively in accordance with various programs stored in the storage unit 48. The driving control unit 54 controls the operation of the ultrasonic press-fitting apparatus 44. When a control signal for starting the operation of the ultrasonic press-fitting apparatus 44 has been output from the driving control unit 54, the ultrasonic press-fitting apparatus 44 operates the pressing unit 58 and the ultrasonic oscillator 66. Note that the driving control unit 54 may be formed as a structure separated from the control device 42, and for example a programmable logic controller (PLC) may be used.

The determination unit 56 performs a monitoring process on the basis of monitoring data taken from the ultrasonic press-fitting apparatus 44. The monitoring process is described below in detail. The determination unit 56 outputs data expressing the results of the monitoring process to the display unit 52.

The storage unit 48 includes a ROM (Read Only Memory) and a RAM (Random access memory). The ROM stores various programs for a driving control process, the monitoring process, and the like that are executed by the CPU, and data necessary to execute these programs. Various programs and data stored in the ROM are loaded in the RAM and executed. For example, the storage unit 48 stores in advance a non-defective product lower-limit output value, a non-defective product upper-limit output value, a non-defective product lower-limit sinking amount, and a non-defective product upper-limit sinking amount as the data necessary when the monitoring process program is executed.

The storage unit 48 may employ a magnetic memory such as a hard disk drive (HDD) or an optical memory such as an optical disk. Alternatively, various programs and data may be stored in a recording medium that is detachably attached to the control device 42.

The input unit 50 may be any device that can input data, and for example, a touch panel, a keyboard, or the like. An operator can input letters, numerals, symbols, and the like using the input unit 50. When operated by the user, the input unit 50 generates the signal for that operation. Then, the generated signal is output to the calculation process unit 46 as a user's instruction.

The display unit 52 displays data of the monitoring result processed by the determination unit 56. The display unit 52 includes a display such as a liquid crystal display (LCD), a plasma display, or an organic electroluminescence (EL) display, and displays the result of the monitoring process in accordance with the data output from the determination unit 56.

Figure 5:
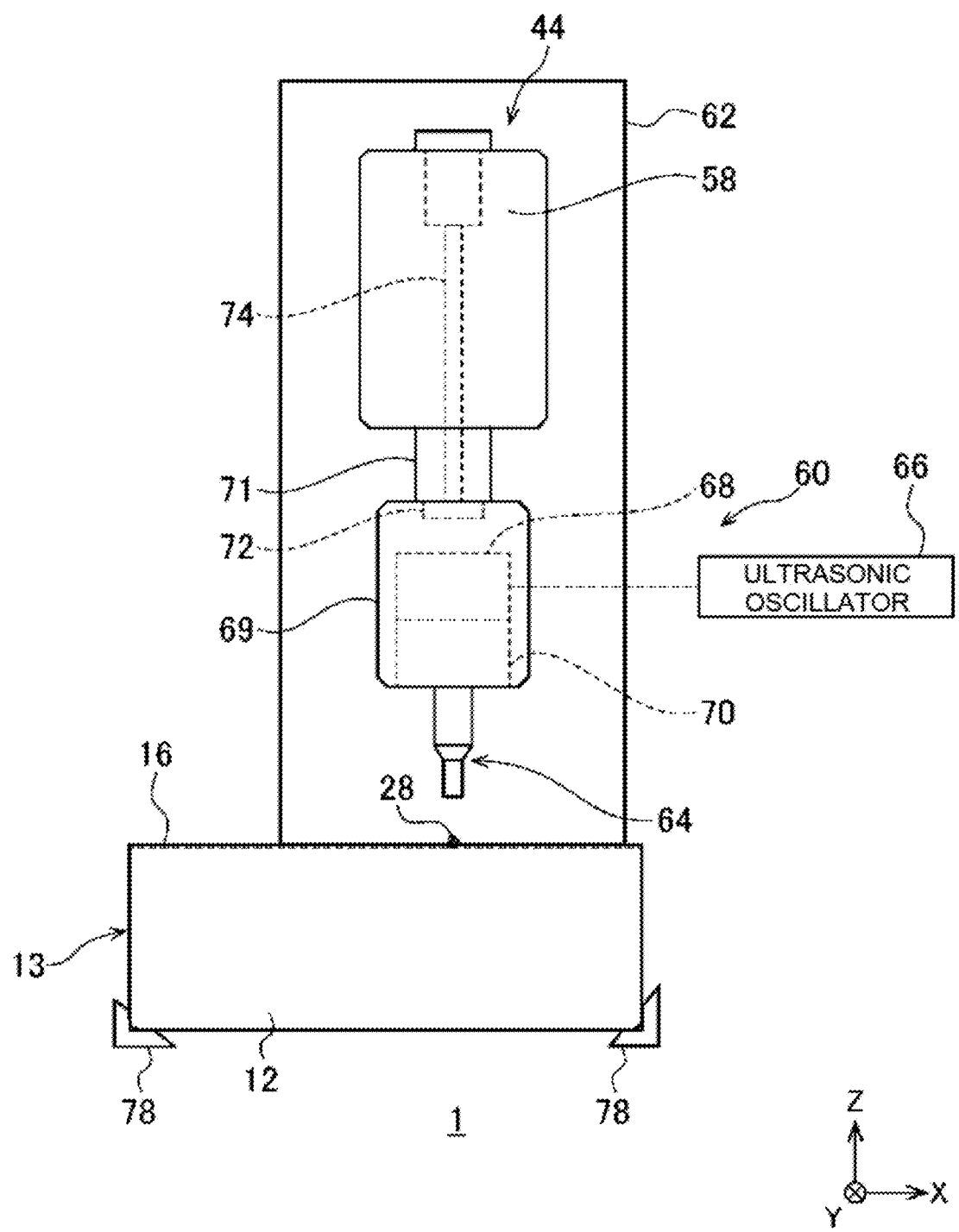
FIG. 5 is a schematic view illustrating an ultrasonic press-fitting apparatus according to the present embodiment.

As illustrated in FIG. 5, the ultrasonic press-fitting apparatus 44 is attached to a pedestal 62 extending in a Z-axis that is orthogonal to an XY plane of a base 1. The ultrasonic press-fitting apparatus 44 includes a hone 64 that regards the Z-axis direction as the press-fitting direction, is brought into contact with the sealing member 28 disposed in the electrolyte solution injection hole 26 provided to the cover plate 16, and press-fits the sealing member 28 into the electrolyte solution injection hole 26 while applying the press-fitting load and the ultrasonic vibration with a frequency of 20 kHz or more in parallel to the press-fitting direction. The hone 64 is a member with a circular columnar shape, and its point end may be flat or be provided with a plurality of convex parts. A base end of the hone 64 is connected to a point end of a case 69. On the base 1, a holder 78 is provided. The holder 78 positions a cell 13 in the press-fitting step and prevents the collapse of the cell 13. The holder 78 holds at least four corners of the battery case 12 on the bottom surface side.

The pressing unit 58 can use a fluid pressure cylinder such as a hydraulic cylinder or an air cylinder, a motor, or the like, and applies a predetermined press-fitting load from a press-fitting shaft 71 to the hone 64. The press-fitting shaft 71 is connected to a base end of the case 69. To the pressing unit 58, a load cell 72 is provided. When the sealing member 28 is press-fitted to the electrolyte solution injection hole 26, the load cell 72 detects the load applied to the hone 64 and outputs an analog signal in proportion to the load. The load cell 72 can be provided between the press-fitting shaft 71 and the case 69, for example. Since the load cell 72 detects the load applied from the press-fitting shaft 71 to the case 69, the press-fitting load applied to the sealing member 28 can be measured. In addition, the load cell 72 may be installed on the base 1. On the load cell installed on the base 1, the cell 13 is disposed and the load applied to the cell 13 is detected by the load cell; thus, the press-fitting load applied to the sealing member 28 can be measured.

The pressing unit 58 is provided with a linear scale (also referred to as a linear encoder) 74, and when the sealing member 28 is press-fitted to the electrolyte solution injection hole 26, the linear scale 74 detects the displacement of the press-fitting shaft 71 in the Z-axis direction and outputs the analog signal in proportion to the displacement. Since the linear scale 74 detects the displacement of the press-fitting shaft 71 in the Z-axis direction, the sinking amount of the hone 64 can be measured. The linear scale 74 may be replaced by a position sensor such as a laser displacement meter.

The ultrasonic wave applying unit 60 applies ultrasonic vibration in parallel to the Z-axis corresponding to the press-fitting direction to the hone 64. The ultrasonic oscillator 66 generates electric signals with 20 kHz or more. When the sealing member 28 is press-fitted to the electrolyte solution injection hole 26, the ultrasonic oscillator 66 outputs the analog signal in proportion to the frequency of the ultrasonic wave applied to the hone 64 and the analog signal in proportion to the output value of the ultrasonic wave applied to the hone 64.

Various analog signals output from the pressing unit 58 and the ultrasonic oscillator 66 are converted into digital signals through an A/D converter 76, and output as monitoring data to the control device 42.

The converter 68 and the booster 70 are provided in the case 69. The case 69 is a circular cylindrical member, and has a base end connected to a point end of the press-fitting shaft 71 and has a point end connected to the base end of the hone 64. That is to say, the press-fitting shaft 71 is connected to the hone 64 through the case 69. The converter 68 is formed by a piezoelectric element electrically connected to the ultrasonic oscillator 66, and when the electric signal is supplied from the ultrasonic oscillator 66, the thickness is changed so that the electric energy is converted into the vibrating energy. The converter 68 is disposed so that the thickness direction, that is, the vibrating direction is in parallel to the Z-axis, and connected to an upper side of the booster 70 along the Z-axis. The booster 70 amplifies the vibrating energy of the converter 68. The booster 70 has its lower side along the Z-axis connected to the base end of the hone 64, and transmits the amplified vibrating energy to the hone 64. Thus, the hone 64 vibrates in parallel to the Z-axis.

2. Manufacturing Method

Next, the manufacturing method for the secondary battery 10 using the manufacturing apparatus 40 is described. The manufacturing method according to the present embodiment includes a preparing step of preparing the cell 13 in which, after the electrolyte solution is injected, the sealing member 28 is disposed at the electrolyte solution injection hole 26, and a press-fitting step of press-fitting the sealing member 28 into the electrolyte solution injection hole 26. Since the preparing step may be the same as the conventional method, the description is omitted.

The cell 13 having the sealing member 28 disposed at the electrolyte solution injection hole 26 is disposed on the base 1 that is in parallel to the XY plane with the cover plate 16 facing upward in the Z-axis direction, and is fixed with the holder 78. The surface of the cover plate 16 is parallel to the XY plane, and the central axis of the electrolyte solution injection hole 26 is parallel to the Z-axis (FIG. 6). The point end of the hone 64 is brought into contact with the sealing member 28 with the central axis of the hone 64 aligned with the central axis of the electrolyte solution injection hole 26. While pressing the sealing member 28 with the predetermined press-fitting load in the Z-axis direction and applying the ultrasonic vibration vibrating in parallel to the Z-axis to the sealing member 28 in this state, the hone 64 press-fits the sealing member 28 into the electrolyte solution injection hole 26. The press-fitting load is preferably 60 N or more and less than 150 N. The press-fitting load is more preferably 130 N or less, much more preferably 110 N or less. The frequency of the ultrasonic vibration is 20 kHz or more. The frequency of the ultrasonic vibration is preferably 80 kHz or less. In the ultrasonic vibration, it is preferable that the press-fitting time is about 0.1 to 1.0 seconds and the amplitude is 5 μm or more and 50 μm or less.

The sealing member 28 pressed by the hone 64 moves to the Z-axis direction, is deformed by the contact with the external tapered plane 35 and the intermediate tapered plane 36, and at the same time, the sealing member 28 further enters the electrolyte solution injection hole 26 in a way of being pushed along the straight plane 32. As the press-fitting time passes, the driving control unit 54 outputs the control signal for stopping the press-fitting operation to the ultrasonic press-fitting apparatus 44. When the control signal for stopping the press-fitting operation has been output from the driving control unit 54, the ultrasonic press-fitting apparatus 44 drives the pressing unit 58 to move the hone 64 in a direction away from the sealing member 28 and stops the ultrasonic oscillator 66. In this manner, the sealing member 28 is press-fitted to the electrolyte solution injection hole 26 and the sealing part 24 with the cover plate 16 and the sealing member 28 unified is formed. The driving control unit 54 may output the control signal for stopping the press-fitting operation to the ultrasonic press-fitting apparatus 44 at the timing when the sinking amount exceeds a certain value on the basis of the monitoring data to be described below.

Figure 7:
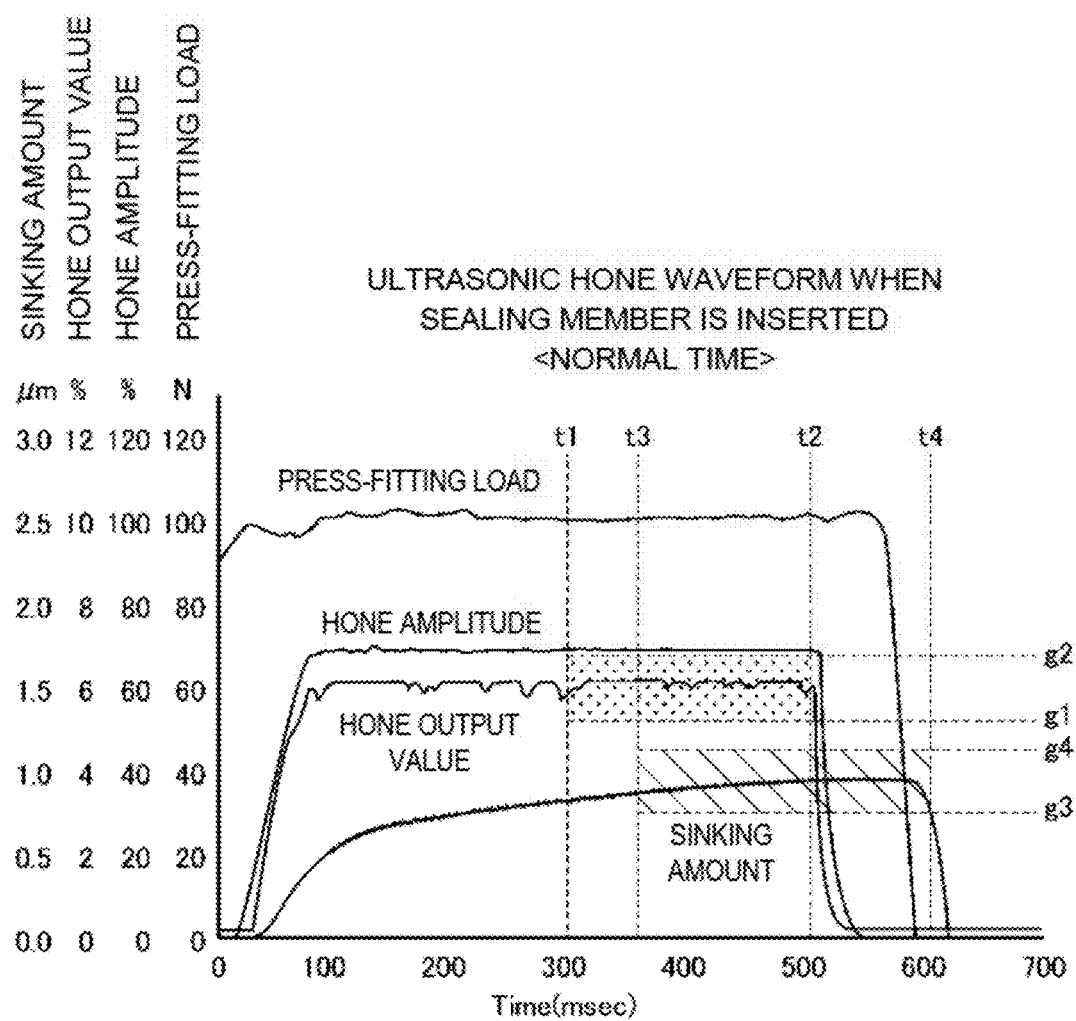
FIG. 7 is a graph showing one example of a result of monitoring a non-defective product used in the description of the manufacturing method for a secondary battery according to the present embodiment.

The determination unit 56 reads out the non-defective product lower-limit output value and the non-defective product upper-limit output value in the hone output values, and the non-defective product lower-limit sinking amount and the non-defective product upper-limit sinking amount in the sinking amounts from the storage unit 48, performs the monitoring process on the basis of the monitoring data taken from the ultrasonic press-fitting apparatus 44, and causes the display unit 52 to display the data of the monitoring result (FIG. 7).

In FIG. 7, the horizontal axis expresses time (msec) and the vertical axis expresses press-fitting load (N), hone amplitude (%), hone output value (%), and sinking amount (μm), and each waveform expresses the result of monitoring a non-defective product. The hone amplitude is the value assuming that a predetermined hone amplitude, 50 μm, is 100 and the hone output value is the value assuming that a predetermined hone output value, 400 W, is 100. In this drawing, the waveform of the hone output value is referred to as the output value waveform and the waveform of the sinking amount is referred to as a sinking amount waveform. During the press-fitting state is normal, the press-fitting load, the hone amplitude, and the hone output value are maintained stably in a certain range after the start of the press-fitting. In addition, since the sealing member 28, while being deformed, enters the electrolyte solution injection hole 26 through the tapered plane 34, the sinking amount increases as time passes and remains to be less than or equal to the certain value when the sealing member 28 has reached the straight plane 32.

The abnormality in the press-fitting state occurs mainly depending on the size of the sealing member 28 or the inner diameter of the electrolyte solution injection hole 26; therefore, the abnormality is more likely to occur in the monitor data after a predetermined time from the start of the press-fitting than immediately after the start of the press-fitting.

In the present embodiment, if the hone output value in a predetermined range from t1 to t2 in a latter half of the press-fitting step is in the range of a non-defective product lower-limit output value g1 or more and a non-defective product upper-limit output value g2 or less (hereinafter referred to as "allowable output value region"), the determination unit 56 determines that it is a non-defective product. The non-defective product lower-limit output value g1 and the non-defective product upper-limit output value g2 can be set on the basis of a reference output value set based on a non-defective product output value waveform obtained by manufacturing a plurality of samples in advance in accordance with the above-described method and obtaining the output value waveform of the non-defective product. The reference output value may be the value obtained by averaging a plurality of measurement values in the non-defective product output value waveform in the range of t1 to t2 with the entire samples. The non-defective product lower-limit output value g1 and the non-defective product upper-limit output value g2 can be, for example, the value within the range of ±20 to 40% relative to the reference output value.

If the sinking amount in a predetermined range of t3 to t4 in the latter half of the press-fitting step is in the range of a non-defective product lower-limit sinking amount g3 or more and a non-defective product upper-limit sinking amount g4 or less (hereinafter referred to as "allowable sinking amount region"), the determination unit 56 determines that it is a non-defective product. The values t3 and t4 may be either different from or the same as t1 and t2 described above. The non-defective product lower-limit sinking amount g3 and the non-defective product upper-limit sinking amount g4 can be set based on a reference sinking amount set based on a non-defective product sinking amount waveform that is obtained in advance similarly to the case of the hone output value. The reference sinking amount may be the value obtained by averaging a plurality of measurement values in the non-defective product sinking amount waveform in the range of t3 to t4 with the entire samples. The non-defective product lower-limit sinking amount g3 and the non-defective product upper-limit sinking amount g4 can be, for example, the value within the range of ±20 to 40% relative to the reference sinking amount.

In the predetermined range t1 to t2 from the start to the end of the press-fitting in the graph shown in FIG. 7, the output value waveform expressing the time change of the output value of the hone 64 is the non-defective product lower-limit output value g1 or more and the non-defective product upper-limit output value g2 or less. Therefore, since the output value waveform in the above range is in the allowable output value region, the determination unit 56 determines that the press-fitting state of the secondary battery 10 based on the output value waveform is the non-defective product.

In addition, in the predetermined range t3 to t4 from the start to the end of the press-fitting, the sinking amount waveform expressing the time change of the sinking amount of the hone 64 is the non-defective product lower-limit sinking amount g3 or more and the non-defective product upper-limit sinking amount g4 or less. Therefore, since the sinking amount waveform in the above range is in the allowable sinking amount region, the determination unit 56 determines that the press-fitting state of the secondary battery 10 based on the sinking amount waveform is the non-defective product.

Figure 8:
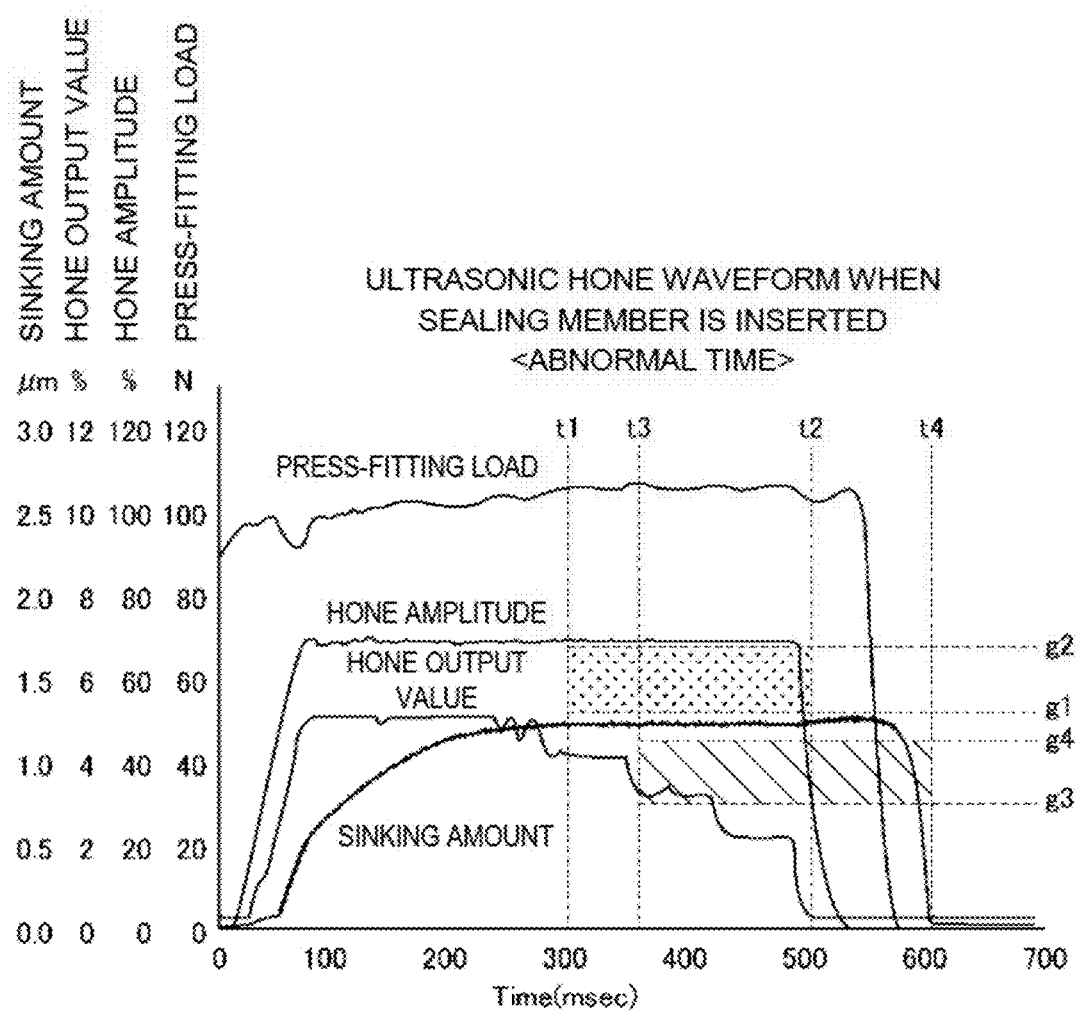
FIG. 8 is a graph showing one example of a result of monitoring a defective product used in the description of the manufacturing method for a secondary battery according to the present embodiment.

On the other hand, FIG. 8 is a graph expressing the result of monitoring the defective product. In the predetermined range t1 to t2 from the start to the end of the press-fitting in FIG. 8, the output value waveform expressing the time change of the output value of the hone 64 is less than the non-defective product lower-limit output value g1. It is considered that the output value waveform is less than the non-defective product lower-limit output value g1 because the sealing member 28 is too small or the electrolyte solution injection hole 26 is too large and thus, the sealing member 28 has been press-fitted into the electrolyte solution injection hole 26 without resistance and the output value has decreased. Therefore, since the output value waveform in the above range is out of the allowable output value region, the determination unit 56 determines that the press-fitting state of the secondary battery 10 based on the output value waveform is the defective product.

In addition, in the predetermined range t3 to t4 from the start to the end of the press-fitting, the sinking amount waveform expressing the time change of the sinking amount of the hone 64 is more than the non-defective product upper-limit sinking amount g4. It is considered that the sinking amount waveform is more than the non-defective product upper-limit sinking amount g4 because the sealing member 28 is too small or the electrolyte solution injection hole 26 is too large as described above and thus, the sealing member 28 has entered deeply the electrolyte solution injection hole 26 and the sinking amount has increased. Therefore, since the sinking amount waveform in the above range is out of the allowable sinking amount region, the determination unit 56 determines that the press-fitting state of the secondary battery 10 based on the sinking amount waveform is the defective product.

As described above, since the hone output value and the sinking amount change in conjunction with each other, the determination unit 56 can determine whether the press-fitting state of the secondary battery 10 is non-defective on the basis of the monitoring result of one of the output value waveform and the sinking amount waveform. The determination unit 56 may determine whether the press-fitting state of the secondary battery 10 is non-defective on the basis of the monitoring results of both the output value waveform and the sinking amount waveform. If the determination unit 56 determines that the output value waveform has exceeded the allowable output value region or the sinking amount waveform has exceeded the allowable sinking amount region, the driving control unit 54 may output the control signal for stopping the press-fitting operation to the ultrasonic press-fitting apparatus 44 and stop the press-fitting operation immediately.

Regarding the hone output value, a stable output value region where the bonding state is favorable may be set in the allowable output value region. The stable output value region is a region between a warning lower-limit output value larger than the non-defective product lower-limit output value g1 and a warning upper-limit output value smaller than the non-defective product upper-limit output value g2. The warning lower-limit output value and the warning upper-limit output value may be, for example, values in the range of ±10 to 15% relative to the reference output value. The determination unit 56 determines that the bonding state is favorable when the output value waveform is in the stable output value region, determines that the reliability is poor but there is no problem in use when the output value waveform is over the stable output value region and within the allowable output value region, and determines that the bonding state is defective when the output value waveform is over the allowable output value region.

Regarding the sinking amount, similarly to the hone output value, a stable sinking amount region where the press-fitting state is favorable may be set in the allowable sinking amount region. The stable sinking amount region is a region between a warning lower-limit sinking amount larger than the non-defective product lower-limit sinking amount g3 and a warning upper-limit sinking amount smaller than the non-defective product upper-limit sinking amount g4. The warning lower-limit sinking amount and the warning upper-limit sinking amount may be, for example, values in the range of ±10 to 15% relative to the reference sinking amount. The determination unit 56 determines that the bonding state is favorable when the sinking amount waveform is in the stable sinking amount region, determines that the reliability is poor but there is no problem in use when the sinking amount waveform is over the stable sinking amount region and within the allowable sinking amount region, and determines that the bonding state is defective when the sinking amount waveform is over the allowable sinking amount region.

In the case where the output value waveform is over the stable output value region and within the allowable output value region, or the sinking amount waveform is over the stable sinking amount region and within the allowable sinking amount region, the determination unit 56 determines that the reliability is low and causes the display unit 52 to display warning so as to warn the user.

Moreover, the output value waveform and the sinking amount waveform may be divided into a plurality of sections for each time from the start of the press-fitting to the end of the press-fitting, and for each of the sections, the allowable output value region, the allowable sinking amount region, the stable output value region, and the stable sinking amount region may be set.

3. Operation and Effect

In the manufacturing method for the secondary battery 10 according to the present embodiment, while the ultrasonic vibration vibrating in the press-fitting direction is applied to the sealing member 28, the sealing member 28 is press-fitted to the electrolyte solution injection hole 26. By applying the ultrasonic vibration in the press-fitting direction to the sealing member 28, the resistance at the press-fitting decreases and the sealing member 28 can be press-fitted to the electrolyte solution injection hole 26 smoothly with the press-fitting load small enough not to deform the cover plate 16. Since the sealing member 28 is deformed along the shape of the electrolyte solution injection hole 26 and the ultrasonic vibration is applied, the surface of the electrolyte solution injection hole 26 and the sealing member 28 are brought into surface contact with each other and very high holding power can be secured. Therefore, the manufacturing method for the secondary battery 10 according to the present embodiment is applicable to the secondary battery 10 in which the electrolyte solution injection hole 26 has an inner diameter of 1.5 mm or more.

Since the sealing member 28 is formed of the metal that is less hard than the metal of the cover plate 16, the sealing member 28 is deformed easily along the shape of the electrolyte solution injection hole 26. Therefore, the bonding surface between the sealing member 28 and the electrolyte solution injection hole 26 becomes uniform and the high holding power can be stably obtained.

By monitoring the hone output value and the sinking amount, the determination unit 56 determines whether the press-fitting state is defective or non-defective. Thus, the determination unit 56 can check the entire press-fitting states in the manufacture, and guarantee the press-fitting state of the sealing part 24.

Figure 9:
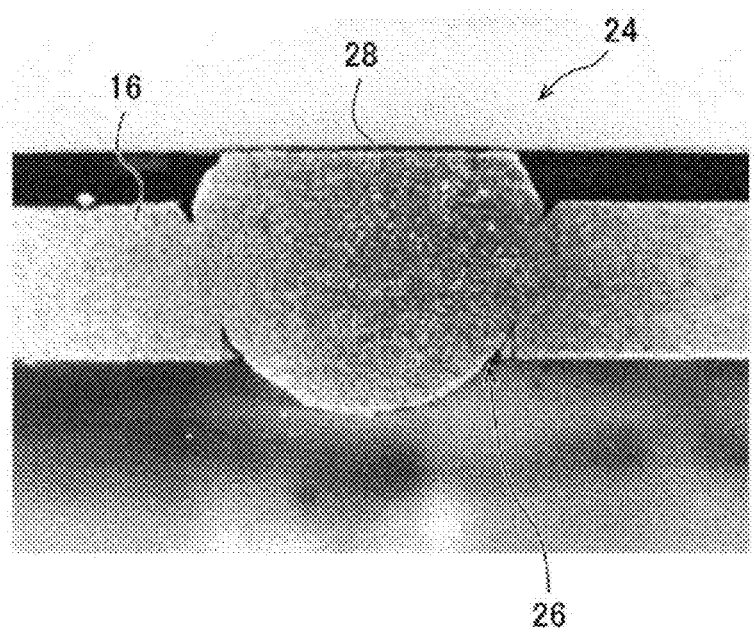
FIG. 9 is a photograph of a cross section of a sample manufactured by the manufacturing method for a secondary battery according to the present embodiment.

FIG. 9 is a photograph of a cross section of the sealing part 24 in the sample in which the sealing member 28 is press-fitted to the electrolyte solution injection hole 26 while the ultrasonic vibration is applied to the sealing member 28 in the press-fitting direction. In the sample, the cover plate 16 has a thickness of 1.4 mm, the electrolyte solution injection hole 26 has an inner diameter of 3 mm, a circumferential surface where the tapered plane and the external surface of the cover plate 16 are in contact has a diameter of 3.6 mm, and the sealing member 28 formed by a sphere has a diameter of 3.2 mm. In the sample, the sealing member 28 is press-fitted to the electrolyte solution injection hole 26 by applying the ultrasonic vibration (frequency 40 kHz, amplitude 25 μm, load 100 N) in the press-fitting direction with a press-fitting load of 110 N. The sealing member 28 formed by a sphere protrudes from the upper surface of the cover plate 16 with the upper part pressed by the hone 64 deformed flatly, although the press-fitting load is small enough not to deform the cover plate 16. In addition, it is acknowledged that the sealing member 28 is in surface contact with the surface of the electrolyte solution injection hole 26 in the region from the tapered plane to the straight plane of the cover plate 16. The surface of the electrolyte solution injection hole 26 and the sealing member 28 are unified, and the border between the surface of the electrolyte solution injection hole 26 and the sealing member 28 cannot be recognized in FIG. 9. The lower part of the sealing member 28 is spherical and protrudes from the lower surface side of the cover plate 16. In the sealing part 24 formed in this manner, the contact area between the sealing member 28 and the surface of the electrolyte solution injection hole 26 is so wide that the higher holding power can be obtained.

Figure 10:
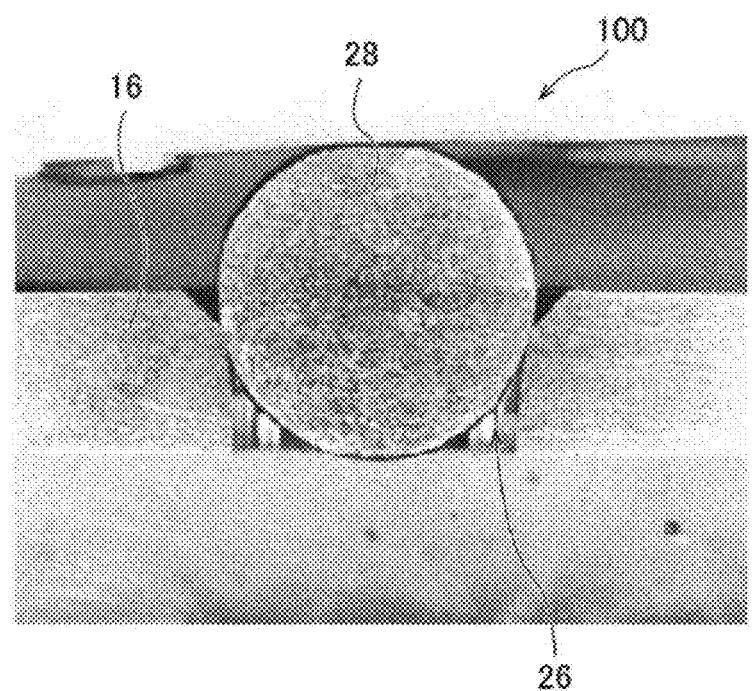
FIG. 10 is a photograph of a cross section of a sample manufactured by a conventional manufacturing method.

FIG. 10 is a photograph of a cross section of a sealing part 100 in a sample in which the sealing member 28 is press-fitted to the electrolyte solution injection hole 26 under the same sample and condition as those of FIG. 9 except that the ultrasonic vibration is not applied. The sealing member 28 maintains the spherical shape substantially without deformation after the press-fitting, and at the border between the straight plane 32 and the tapered plane 34, it is acknowledged that the sealing member 28 is in line contact with the electrolyte solution injection hole 26. The lower part of the sealing member 28 does not protrude from the lower surface side of the cover plate 16. In FIG. 10, the border where the sealing member 28 and the electrolyte solution injection hole 26 are in contact can be recognized. In the sealing part 100, the contact area between the sealing member 28 and the surface of the electrolyte solution injection hole 26 is so small that the holding power is also small.

The sealing part 24 (FIG. 9) in which the sealing member 28 is press-fitted to the electrolyte solution injection hole 26 while the ultrasonic vibration is applied in the press-fitting direction to the sealing member 28 can obtain the withstanding pressure 200 times that of the sealing part 100 in FIG. 10 because the sealing member 28 is in surface contact with the surface of the electrolyte solution injection hole 26.

The present invention is not limited to the aforementioned embodiment and various changes are possible within the scope of the present invention. For example, the manufacturing method described above includes the preparing step of preparing the cell 13 in which, after the electrolyte solution is injected, the sealing member 28 is disposed at the electrolyte solution injection hole 26; however, the present invention is not limited to this and the manufacturing method may include a preparing step of preparing the cell 13 where the electrolyte solution has been injected, and a disposing step of disposing the sealing member 28 at the electrolyte solution injection hole 26 of the cell 13.

4. Examples

A plurality of samples were manufactured and effects were checked. The thickness of the cover plate of the sample was 1.4 mm, and the sealing member was a ball. The inner diameter R1 of the electrolyte solution injection hole, the diameter R2 of the circumferential surface where the tapered plane and the external surface of the cover plate are in contact, the diameter R3 of the sealing member, and the press-fitting load are as shown in Table 1. Note that the diameter R3 of the sealing member was 3.2 mm when the inner diameter of the electrolyte solution injection hole was 3 mm, was 2.2 mm when the inner diameter of the electrolyte solution injection hole was 2 mm, and was 1.15 mm when the inner diameter of the electrolyte solution injection hole was 1 mm. In the ultrasonic vibration in Examples 1 to 6 and Comparative example 21, the frequency was 40 kHz and the amplitude was 25 µm. In Examples 1 to 6, the ultrasonic vibration that vibrated in parallel to the press-fitting direction was applied; in Comparative example 21, the ultrasonic vibration that vibrated in a direction orthogonal to the press-fitting direction was applied. In Comparative examples 1 to 20, the ultrasonic vibration was not applied. The electrolyte solution injection hole as described above was actually formed in the cover plate and the sealing member was press-fitted to the electrolyte solution injection hole; after that, the withstanding pressure was measured. Then, the holding power of the sealing part was evaluated. The test was conducted with the cover plate alone. In the pressure test, a hydraulic bent pressure measurement machine was used.

As shown in Table 1, the inner diameter of the electrolyte solution injection hole was 2 mm in the sample of Example 1 and the inner diameter of the electrolyte solution injection hole was 3 mm in the samples in Examples 2 to 6. In Examples 1 to 6, the sealing member was press-fitted to the electrolyte solution injection hole while the ultrasonic vibration was applied in the press-fitting direction; thus, it has been confirmed that even if the press-fitting load was small enough not to deform the cover plate, the withstanding pressure as high as 25 MPa or more was obtained in the secondary battery in which the electrolyte solution injection hole had an inner diameter of 2 mm or more. In Example 1, the required press-fitting load was smaller than that in Examples 2 to 6 because the inner diameter of the electrolyte solution injection hole was smaller, and moreover, the withstanding pressure of the same degree as that of Examples 2 to 6 was obtained.

On the other hand, in Comparative examples 1 to 5, the conditions were the same as those in Examples 2 to 6 except that the ultrasonic vibration was not applied, and the withstanding pressure was 1/200 of that in Examples 2 to 6. This indicates that by applying the ultrasonic vibration in the press-fitting direction, the withstanding pressure improved to be 200 times.

In Comparative examples 6 to 20, the inner diameters of the electrolyte solution injection holes are different. In the case where the press-fitting load is 150 N uniformly, the withstanding pressure becomes smaller as the inner diameter of the electrolyte solution injection hole is larger and when the inner diameter is 2 mm or more, the withstanding pressure becomes less than 2 MPa. Thus, in the conventional method of press-fitting the sealing member into the electrolyte solution injection hole without applying the ultrasonic vibration, the predetermined internal pressure cannot be obtained; thus, it is understood that the conventional method is not applicable to the electrolyte solution injection hole with an inner diameter of 2 mm or more.

In Comparative examples 6 to 10, for the structure and the manufacturing method for the conventional secondary battery, the inner diameter of the electrolyte solution injection hole was 1 mm and the press-fitting load was 150 N, and the withstanding pressure was 7.6 MPa on the average. In Examples 1 to 6, the withstanding pressure three times as high as that in Comparative examples 6 to 10 can be obtained. Thus, it has been confirmed that by applying the ultrasonic vibration in the press-fitting direction, the secondary battery in which the electrolyte solution injection hole has an inner diameter of 2 mm or more, having higher withstanding pressure with smaller press-fitting load as compared to the conventional secondary battery in which the electrolyte solution injection hole has an inner diameter of 1 mm can be obtained.

In Comparative example 21, the sealing member was press-fitted to the electrolyte solution injection hole while the ultrasonic vibration vibrating in the direction orthogonal to the press-fitting direction (XY direction in FIG. 5) was applied. In Comparative example 21, the obtained withstanding pressure was equal to that in Examples 1 to 6 (25 MPa) but the press-fitting load was 157 N, and it is understood that the press-fitting load larger than that of Example 1 was necessary in the press-fitting.

Thus, in the manufacturing method for the secondary battery according to the present embodiment, the sealing member is press-fitted to the electrolyte solution injection hole while the ultrasonic vibration is applied to the sealing member in the press-fitting direction; thus, the sealing member can be press-fitted with the smaller press-fitting load and the secondary battery with the higher withstanding pressure including the electrolyte solution injection hole with an inner diameter of 2 mm or more can be manufactured.

TABLE 1

|  | Sample No. | Inner diameter R1 (mm) of injection hole | Diameter R2 (mm) of circumferential surface where tapered plane and cover plate are in contact | Diameter R3 (mm) of sealing member | Ultrasonic vibration | Press-fitting load (N) | Withstanding pressure (MPa) | Average (MPa) |
|---|---|---|---|---|---|---|---|---|
| Examples | 1 | 2.0 | 2.5 | 2.2 | Applied | 69 | 25.0 | — |
|  | 2 | 3.0 | 3.6 | 3.2 | Applied | 110 | 24.8 | 25.7 |
|  | 3 | 3.0 | 3.6 | 3.2 | Applied | 110 | 26.2 |  |
|  | 4 | 3.0 | 3.6 | 3.2 | Applied | 110 | 25.8 |  |
|  | 5 | 3.0 | 3.6 | 3.2 | Applied | 110 | 25.3 |  |
|  | 6 | 3.0 | 3.6 | 3.2 | Applied | 110 | 26.5 |  |
| Comparative examples | 1 | 3.0 | 3.6 | 3.2 | Not applied | 110 | 0.07 | 0.10 |
|  | 2 | 3.0 | 3.6 | 3.2 | Not applied | 110 | 0.10 |  |
|  | 3 | 3.0 | 3.6 | 3.2 | Not applied | 110 | 0.09 |  |
|  | 4 | 3.0 | 3.6 | 3.2 | Not applied | 110 | 0.14 |  |
|  | 5 | 3.0 | 3.6 | 3.2 | Not applied | 110 | 0.09 |  |
|  | 6 | 1.0 | 1.3 | 1.15 | Not applied | 150 | 7.2 | 7.64 |
|  | 7 | 1.0 | 1.3 | 1.15 | Not applied | 150 | 7.8 |  |
|  | 8 | 1.0 | 1.3 | 1.15 | Not applied | 150 | 8.0 |  |
|  | 9 | 1.0 | 1.3 | 1.15 | Not applied | 150 | 7.7 |  |
|  | 10 | 1.0 | 1.3 | 1.15 | Not applied | 150 | 7.5 |  |
|  | 11 | 2.0 | 2.5 | 2.2 | Not applied | 150 | 1.4 | 1.58 |
|  | 12 | 2.0 | 2.5 | 2.2 | Not applied | 150 | 1.3 |  |
|  | 13 | 2.0 | 2.5 | 2.2 | Not applied | 150 | 1.8 |  |
|  | 14 | 2.0 | 2.5 | 2.2 | Not applied | 150 | 1.5 |  |
|  | 15 | 2.0 | 2.5 | 2.2 | Not applied | 150 | 1.9 |  |
|  | 16 | 3.0 | 3.6 | 3.2 | Not applied | 150 | 0.12 | 0.16 |
|  | 17 | 3.0 | 3.6 | 3.2 | Not applied | 150 | 0.20 |  |
|  | 18 | 3.0 | 3.6 | 3.2 | Not applied | 150 | 0.16 |  |
|  | 19 | 3.0 | 3.6 | 3.2 | Not applied | 150 | 0.13 |  |
|  | 20 | 3.0 | 3.6 | 3.2 | Not applied | 150 | 0.18 |  |
|  | 21 | 2.0 | 2.5 | 2.2 | Applied (laterally) | 157 | 25.0 | — |

What is claimed is:

1. A manufacturing method for a secondary battery, the secondary battery including:
   a battery case including a cover plate provided with an electrolyte solution injection hole, and
   a sealing member sealing the electrolyte solution injection hole, the electrolyte solution injection hole having a tapered plane that expands in diameter toward an external surface of the battery case in the cover plate;
   the manufacturing method for the secondary battery comprising:
   a preparing step of preparing a cell in which, after an electrolyte solution is injected to the battery case through the electrolyte solution injection hole, the sealing member is disposed on the electrolyte solution injection hole; and
   a press-fitting step of press-fitting the sealing member into the electrolyte solution injection hole while applying press-fitting load and ultrasonic vibration with a frequency of 20 kHz or more in parallel to a press-fitting direction from a hone in contact with the sealing member.

2. The manufacturing method for a secondary battery according to claim 1, wherein an inner diameter of the electrolyte solution injection hole on a side of an inner surface of the battery case is 1.5 mm or more.

3. The manufacturing method for a secondary battery according to claim 1, wherein the sealing member is a ball.

4. The manufacturing method for a secondary battery according to claim 1, wherein a material of the cover plate is metal and a material of the sealing member is metal that is less hard than the metal of the material of the cover plate.

5. The manufacturing method for a secondary battery according to claim 1, wherein the press-fitting step includes determining whether a press-fitting state of the sealing member is defective or non-defective, based on an output value waveform expressing a time change of an output value of the hone and/or a sinking amount waveform expressing a time change of a sinking amount of the hone.

6. A manufacturing apparatus for a secondary battery, comprising:
   a hone that is configured to contact with a sealing member disposed on an electrolyte solution injection hole provided to a cover plate of a battery case, and while applying press-fitting load and ultrasonic vibration with a frequency of 20 kHz or more in parallel to a press-fitting direction, press-fits the sealing member into the electrolyte solution injection hole; and
   a determination unit that is configured to determine whether a press-fitting state of the sealing member is defective or non-defective, based on an output value waveform expressing a time change of an output value of the hone and/or a sinking amount waveform expressing a time change of a sinking amount of the hone.

7. The manufacturing method for a secondary battery according to claim 3, wherein the press-fitting step includes deforming the sealing member along a shape of the electrolyte solution injection hole to make a surface of the electrolyte solution injection hole and the sealing member being brought into surface contact with each other.

8. The manufacturing method for a secondary battery according to claim 1, wherein the press-fitting load is 60 N or more and less than 150 N.

* * * * *